(12) United States Patent
Tatewaki

(10) Patent No.: US 8,405,766 B2
(45) Date of Patent: Mar. 26, 2013

(54) CAMERA DEVICE AND METHOD FOR ADJUSTING THE ORIENTATION OF THE WINDOW OF A CAMERA COVER

(75) Inventor: Toshikazu Tatewaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 49 days.

(21) Appl. No.: 12/995,920

(22) PCT Filed: Jun. 26, 2009

(86) PCT No.: PCT/JP2009/002956
§ 371 (c)(1),
(2), (4) Date: Dec. 29, 2010

(87) PCT Pub. No.: WO2010/010658
PCT Pub. Date: Jan. 28, 2010

(65) Prior Publication Data
US 2011/0115973 A1 May 19, 2011

(30) Foreign Application Priority Data
Jul. 24, 2008 (JP) .................................. 2008-190553

(51) Int. Cl.
*H04N 5/225* (2006.01)
(52) U.S. Cl. ........ 348/373; 348/143; 348/151; 348/374; 396/427
(58) Field of Classification Search .................. 348/373, 348/374, 151, 143; 396/427
See application file for complete search history.

(56) References Cited

U.S. PATENT DOCUMENTS 7,387,453 B2 6/2008 Arbuckle
7,609,321 B2 10/2009 Yamane
2006/0050150 A1* 3/2006 Yamane ......................... 348/151
2006/0147194 A1* 7/2006 Jones ............................. 396/427

FOREIGN PATENT DOCUMENTS

| JP | 02-015445 | 1/1990 |
| JP | 2004-356669 | 12/2004 |
| JP | 2006-074657 | 3/2006 |
| JP | 2007-074722 | 3/2007 |
| JP | 2007227994 A * | 9/2007 |

OTHER PUBLICATIONS

International Search Report dated Aug. 4, 2009.

* cited by examiner

*Primary Examiner* — Usman Khan
(74) *Attorney, Agent, or Firm* — Dickinson Wright PLLC

(57) ABSTRACT

A camera device (1) includes a camera (2) having a shooting direction which is set at a predetermined direction; a table (3) that supports the camera (2) so as to be rotatable in a horizontal direction; and a cover (4) that is mounted on the table (3) and covers the camera (2). The table (3) includes a first slope portion (9) at a position corresponding to the direction of the camera (2), and the cover (4) includes a window (8) for ensuring a shooting field of view of the camera (2), and a second slope portion (10) having a shape in accordance with that of the first slope portion (9) at a position corresponding to an direction of the window (8). The direction of the window (8) is adjusted to align with the direction of the camera (2) in the horizontal direction when the first slope portion (9) and the second slope portion (10) are brought into contact with each other. Thus, a camera device which makes it possible to easily align the direction of the window of the cover with the direction of the camera is provided.

9 Claims, 8 Drawing Sheets

CAMERA DEVICE AND METHOD FOR ADJUSTING THE ORIENTATION OF THE WINDOW OF A CAMERA COVER

TECHNICAL FIELD

The present invention relates to a camera device in which the operability in installation works of camera, particularly in an adjustment work of the direction of a window of a camera cover is improved.

BACKGROUND ART

Conventionally, as a camera device, a dome type camera is known which is used, for example, for the monitoring of facilities, and is installed on walls and ceilings, etc. of facilities. Such a dome type camera includes a camera that takes photographs in a predetermined shooting direction, a chassis to which the camera is attached, and a dome type cover that is attached to the chassis and covers the camera. Moreover, the dome type cover is provided with a window that is a cut-out of a size corresponding to the angle of view of the camera in order that a field of view in the shooting direction of the camera is ensured and other parts of the camera are protected so as not to be seen from the outside. Therefore, when installing such a dome type camera on a ceiling or wall etc. of a facility, adjustment work to align the shooting direction of the camera with the direction of the window of the cover is needed.

As a conventional dome type camera, there is known a type in which a calibration mark is displayed on each of the chassis and the cover, and the calibration marks are configured to correspond to each other. When installing such conventional dome type camera on a ceiling or wall, etc. of a facility, the calibration mark of the chassis and the calibration mark of the cover are brought into alignment with each other, thereby aligning the shooting direction of the camera and the direction of the window of the cover with each other. For example, Japanese Patent Laid-Open No. 2004-356669 discloses such technology.

CITATION LIST

Patent Literature

Patent Literature 1: Japanese Patent Laid-Open No. 2004-356669

However, in the ease of a conventional dome type camera, when installing the dome type camera on a ceiling or wall etc. of a facility, it is necessary to beforehand bring the calibration mark of the chassis and the calibration mark of the cover into alignment with each other before attaching the cover to the chassis. Then, when it becomes necessary to realign the direction of the window of the cover with the shooting direction of the camera once after the cover has been attached to the chassis and the installation of the dome type camera is completed (for example, when the operator has misread the calibration mark, or the direction of the cover has been changed by an external force due to earthquake, mischiefs, etc.), the cover must be detached from the chassis again to bring the calibration mark of the chassis and the calibration mark of the cover into alignment. Therefore, time and effort will be needed when readjusting the direction of the window of the cover.

SUMMARY OF INVENTION

Technical Problem

The present invention has been made under the above described background. It is an object of the present invention to provide a camera device in which the direction of a window of a cover can be easily aligned with the direction of the camera.

Solution to Problem

An embodiment of the present invention is a camera device, which comprises: a camera having a shooting direction which is set at a predetermined direction; a table that includes a first direction guide portion at a position corresponding to the direction of the camera and supports the camera so as to be rotatable in a horizontal direction; and a cover that includes a window for ensuring a shooting field of view of the camera and a second direction guide portion having a shape in accordance with that of the first direction guide portion at a position corresponding to direction of the window, and that is mounted on the table to cover the camera, wherein the direction of the window is adjusted to align with the direction of the camera in the horizontal direction when the first direction guide portion and the second direction guide portion are caused to abut each other.

Another embodiment of the present invention is a method for adjusting an direction of a window of a camera cover, wherein a first direction guide portion is provided at a position corresponding to a shooting direction of the camera on a table that supports the camera so as to be rotatable in a horizontal direction, and a window for ensuring a shooting field of view of the camera and a second direction guide portion having a shape in accordance with that of the first guide portion at a position corresponding to a direction to ensure a field of view of the window are provided in a cover that is mounted on the table to cover the camera, the method comprising: causing the first direction guide portion and the second direction guide portion to abut each other, thereby adjusting the direction of the window to align with the direction of the camera in a horizontal direction.

As will be described below, the present invention encompasses other embodiments. Therefore, this disclosure of invention intends to provide some embodiments of the present invention, and do not intend to limit the scope of the invention described and claimed herein.

DESCRIPTION OF EMBODIMENTS

Figure 1:
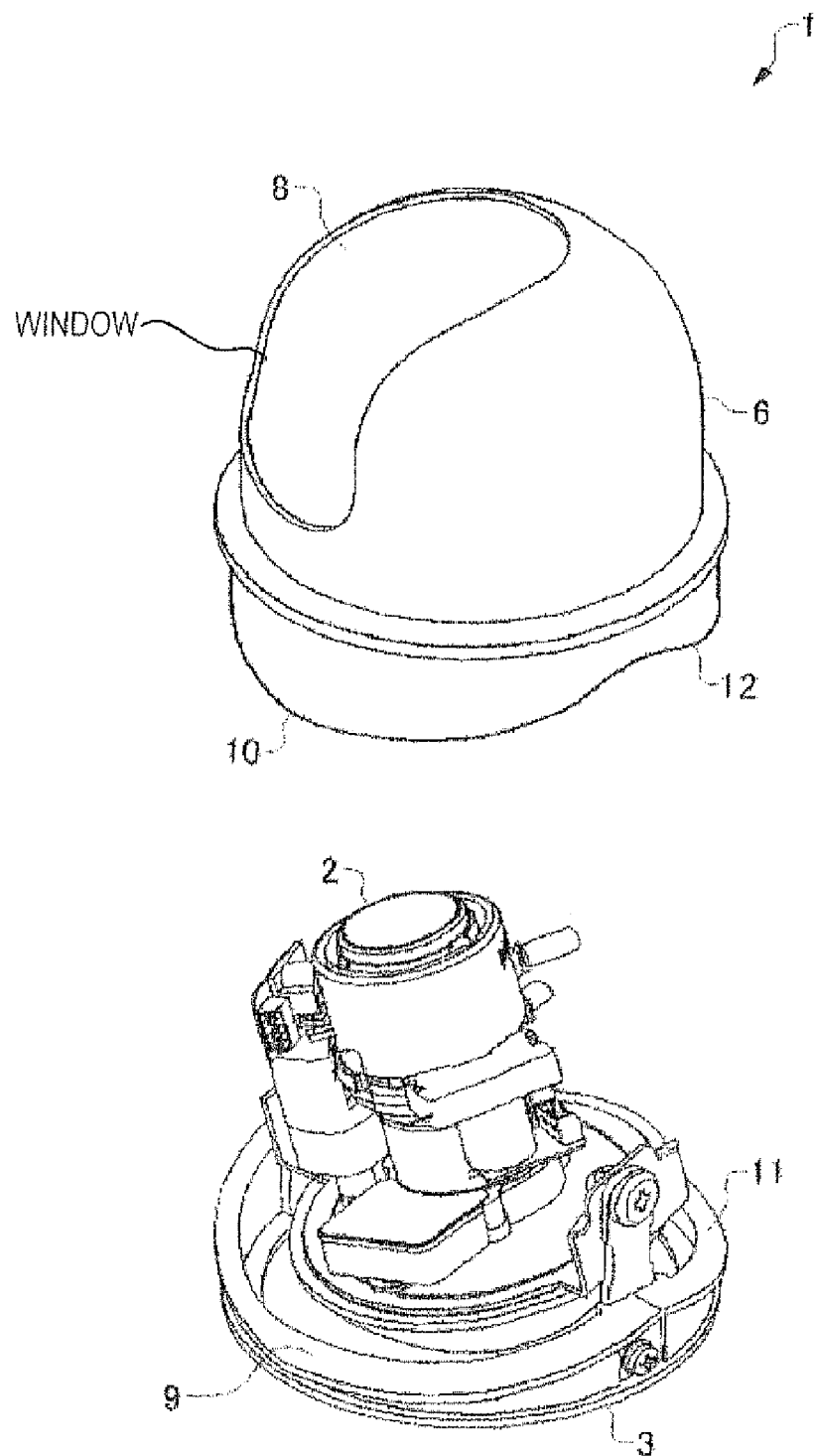
FIG. 1 is an exploded perspective view to illustrate the configuration of principal parts of a camera device in a first embodiment.

Hereafter, the present invention will be described in detail. However, detailed description below and appended drawings will not limit the invention. Instead, the scope of the invention is defined by the appended claims for patent.

A camera device of the present invention has a configuration which comprises: a camera having a shooting direction which is set at a predetermined direction; a table that includes a first direction guide portion at a position corresponding to the direction of the camera and supports the camera so as to be rotatable in a horizontal direction; and a cover that includes a window for ensuring a shooting field of view of the camera and a second direction guide portion having a shape in accordance with that of the first direction guide portion at a position corresponding to direction of the window, and that is mounted on the table to cover the camera, wherein the direction of the window is adjusted to align with the direction of the camera in the horizontal direction when the first direction guide portion and the second direction guide portion are caused to abut each other.

According to this configuration, in the installation work of a camera device, adjusting the direction of the camera and thereafter putting a cover on the camera so that a first direction guide portion and a second direction guide portion are caused to abut each other will result in that the direction of the window comes to align with the direction of the camera in a horizontal direction. This will make it possible to easily align the direction of the window of the cover with the direction of the camera simply by putting the cover on the camera.

Moreover, the camera device of the present invention may have a configuration in which the cover comprises an outer cover and an inner cover, the outer cover is non-rotatably fixed with respect to a case, and the inner cover is rotatable with respect to the case and the outer cover, and includes the window and the second direction guide portion.

According to this configuration, it is possible to prevent the camera from being subjected to an external force, by the outer cover that is non-rotatably fixed with respect to the case. Moreover, upon putting the cover on the camera, the inner cover rotates with respect to the outer cover (and the case), thereby bringing the first direction guide portion and the second direction guide portion into contact with each other. This makes it possible to easily align the direction of the window of the inner cover with the direction of the camera simply by putting the cover on the camera.

Moreover, the camera device of the present invention may have a configuration which comprises a control unit that adjusts the direction of the camera by rotating the camera in a horizontal direction, wherein the direction of the window is adjusted to align with the direction of the camera in a horizontal direction when the adjustment of the direction of the camera is performed.

According to this configuration, as the direction of the camera is changed by operating the control unit, the direction of the window will change accordingly. For example, upon a readjustment of the direction of the camera being performed, following which, the direction of the window is adjusted. This will allow the direction of the window of the cover to be automatically aligned with the direction of the camera, when the direction of the camera is adjusted.

Moreover, the camera device of the present invention may have a configuration in which a surface of the outer cover is treated with smoke processing.

According to this configuration, the outer cover can prevent the inside of the camera from being seen from outside, thereby improving crime prevention effects. In this case, since even if the inside of the camera is cannot be seen from outside, the direction of the window of the inner cover can be aligned with the direction of the camera simply by putting the cover on the camera, a high workability in the installation work (the adjustment work of the direction of the window of the cover) of the camera device is maintained.

Moreover, the camera device of the present invention may have a configuration in which the first direction guide portion is a first slope portion that is provided on an upper surface of the table and is inclined such that a position corresponding to the direction of the camera is lowered, and the second direction guide portion is a second slope portion that is provided on an under surface of the cover and is included such that a position corresponding to the direction of the window is lowered.

According to this configuration, upon bringing the first slope portion and the second slope portion into contact with each other by putting the cover on the camera, the direction of the window will come to align with the direction of the camera in a horizontal direction. This makes it possible to easily align the direction of the window of the cover with the direction of the camera, simply by putting the cover on the camera. In this case, since the position corresponding to the direction of the camera is lowered in the first slope portion, and the position corresponding to the direction of the window is lowered in the second slope portion, it is possible to ensure a large field of view of camera.

Moreover, the camera device of the present invention may have a configuration in which a first symmetric slope portion having a same shape as that of the first slope portion is provided at a position corresponding to an opposite direction of the camera, and a second symmetric slope portion having a same shape as that of the second slope portion is provided at a position corresponding to an opposite direction of the window.

According to this configuration, when the cover is put on the camera with the direction of the camera being opposite to the direction of the window, the first symmetric slope portion will come into contact with the second slope portion, and the second symmetric slope portion will come into contact with the first slope portion, thereby allowing the cover to be put on the camera. This makes it possible to prevent that an excess force is exerted to bring the first slope portion and the second slope portion into contact with each other when the cover is put on the camera in an opposite direction.

Moreover, the camera device of the present invention may have a configuration in which a first asymmetric portion having a different shape from that of the first slope portion is provided at a position corresponding to an opposite direction of the camera, and a second asymmetric portion having a different shape from that of the second slope portion is provided at a position corresponding to an opposite direction of the window.

According to this configuration, when the cover is put on the camera with the direction of the camera being opposite to the direction of the window, the first asymmetric portion comes into contact with the second slope portion, and the second asymmetric portion comes into contact with the first slope portion, thereby not allowing the cover to be put on the camera. This makes it possible to sense that the cover has been put on the camera in an opposite direction.

The method of the present invention is a method for adjusting an direction of a window of a camera cover, wherein a first direction guide portion is provided at a position corresponding to a shooting direction of the camera on a table that supports the camera so as to be rotatable in a horizontal direction, and a window for ensuring a shooting field of view of the camera and a second direction guide portion having a shape in accordance with that of the first guide portion at a position corresponding to a direction to ensure a field of view of the window are provided in a cover that is mounted on the table to cover the camera, the method comprising: causing the first direction guide portion and the second direction guide portion to abut each other, thereby adjusting the direction of the window to align with the direction of the camera in a horizontal direction.

According to this method, upon the first direction guide portion and the second direction guide portion being brought into contact with each other by putting the cover on the camera after the adjustment of the direction of the camera in the installation work of the camera device, the direction of the window will come to align with the direction of the camera in a horizontal direction. This makes it possible to easily align the direction of the window of the cover with the direction of the camera, simply by putting the cover on the camera.

The present invention makes it possible to easily align the direction of the window of the cover with the direction of the camera by providing the first direction guide portion corresponding to the direction of the camera on the table, and by providing the second direction guide portion corresponding to the direction of the window on the cover.

Hereafter, a camera device of an embodiment of the present invention will be described with reference to the drawings. In the present embodiment, a case of a camera device that is used as a security camera etc. to be installed on a wall or ceiling of a facility will be exemplified.

First Embodiment

Figure 2:
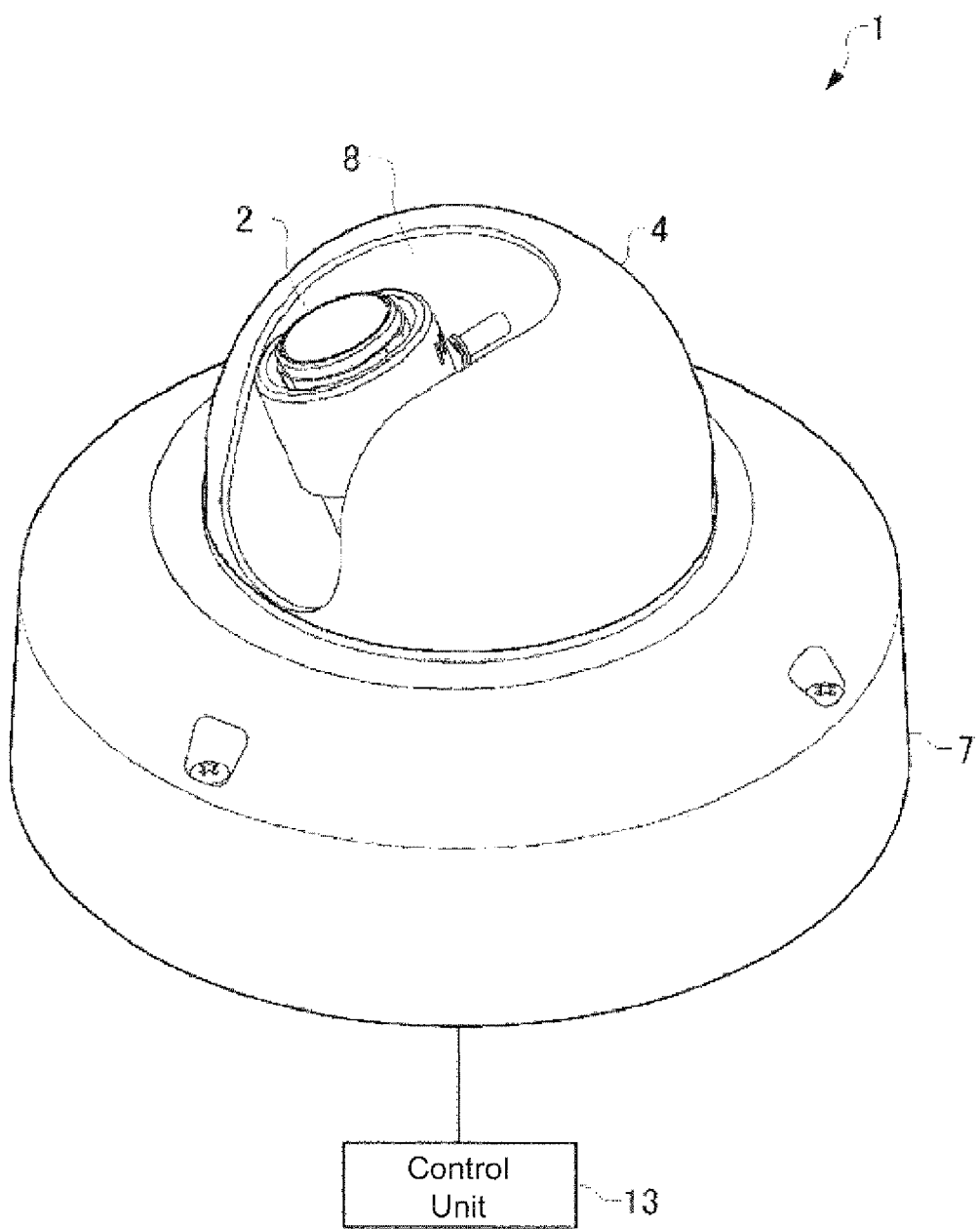
FIG. 2 is a perspective view to show the configuration of the whole of the camera device in the first embodiment.
Figure 3:
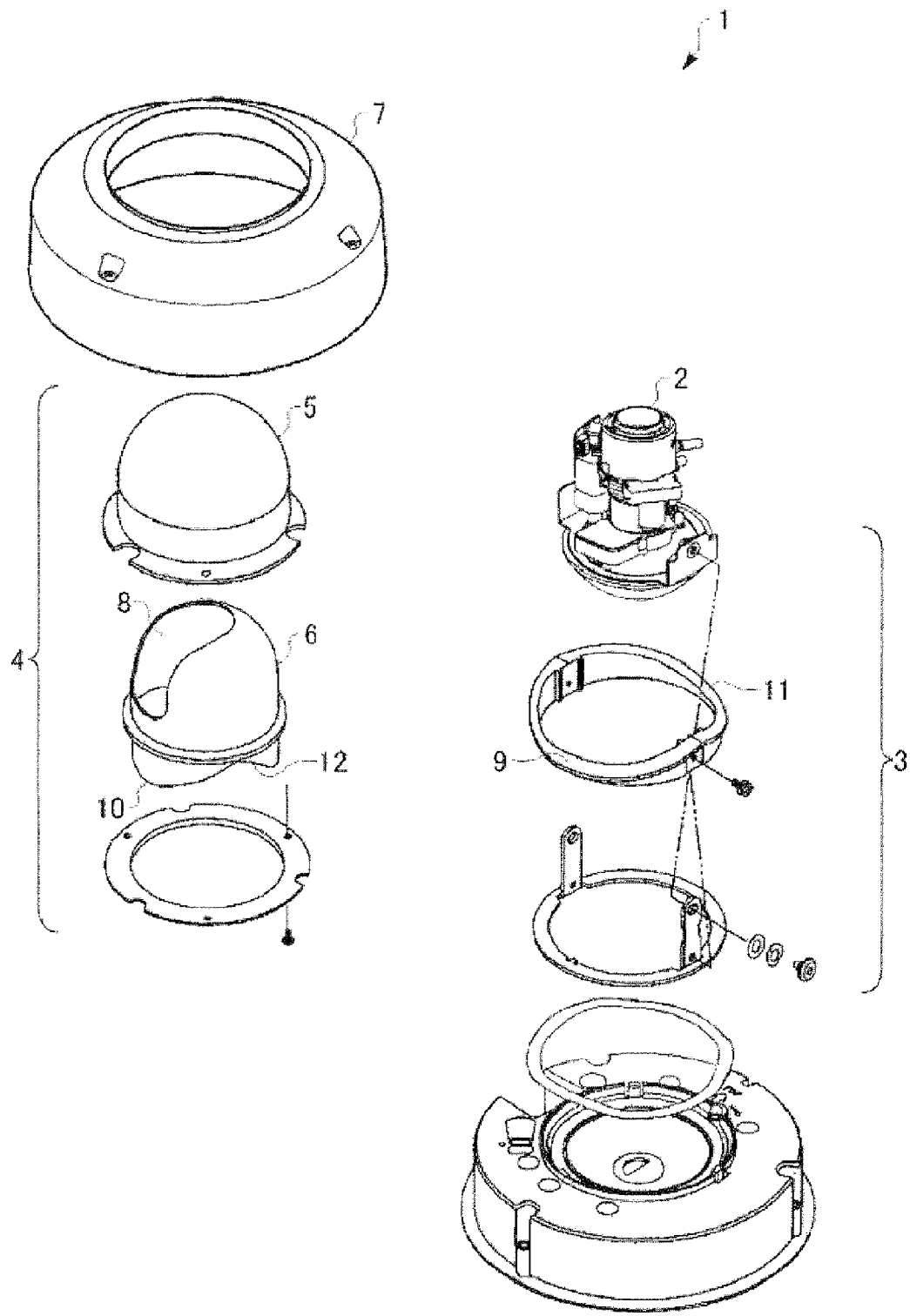
FIG. 3 is an exploded perspective view of the camera device in the first embodiment.

A camera device of a first embodiment of the present invention will be described with reference to FIGS. 1 to 6. FIG. 1 is an exploded perspective view to illustrate the configuration of principal parts of a camera device in the present embodiment. FIG. 2 is a perspective view to show the configuration of the whole of the camera device of the present embodiment, and FIG. 3 is an exploded perspective view of the camera device. Moreover, FIG. 4 is sectional view of the camera device.

As shown in FIGS. 1 to 4, a camera device 1 includes a camera 2 that is set to a predetermined shooting direction, a table 3 that supports the camera 2 so as to be rotatable in a horizontal direction (panning direction) and a vertical direction (tilting direction), and a cover 4 that is mounted on the table 3 and covers the camera 2.

As shown in FIG. 3, the cover 4 comprises an outer cover 5 and an inner cover 6, and the outer cover 5 is non-rotatably fixed with respect to a case 7. The inner cover 6 is rotatable with respect to the case 7 and the outer cover 5. The whole surface of the outer cover 5 is treated with smoke processing, and the inner cover 6 is provided with a window 8 for ensuring a shooting field of view of the camera 2.

Figure 4:
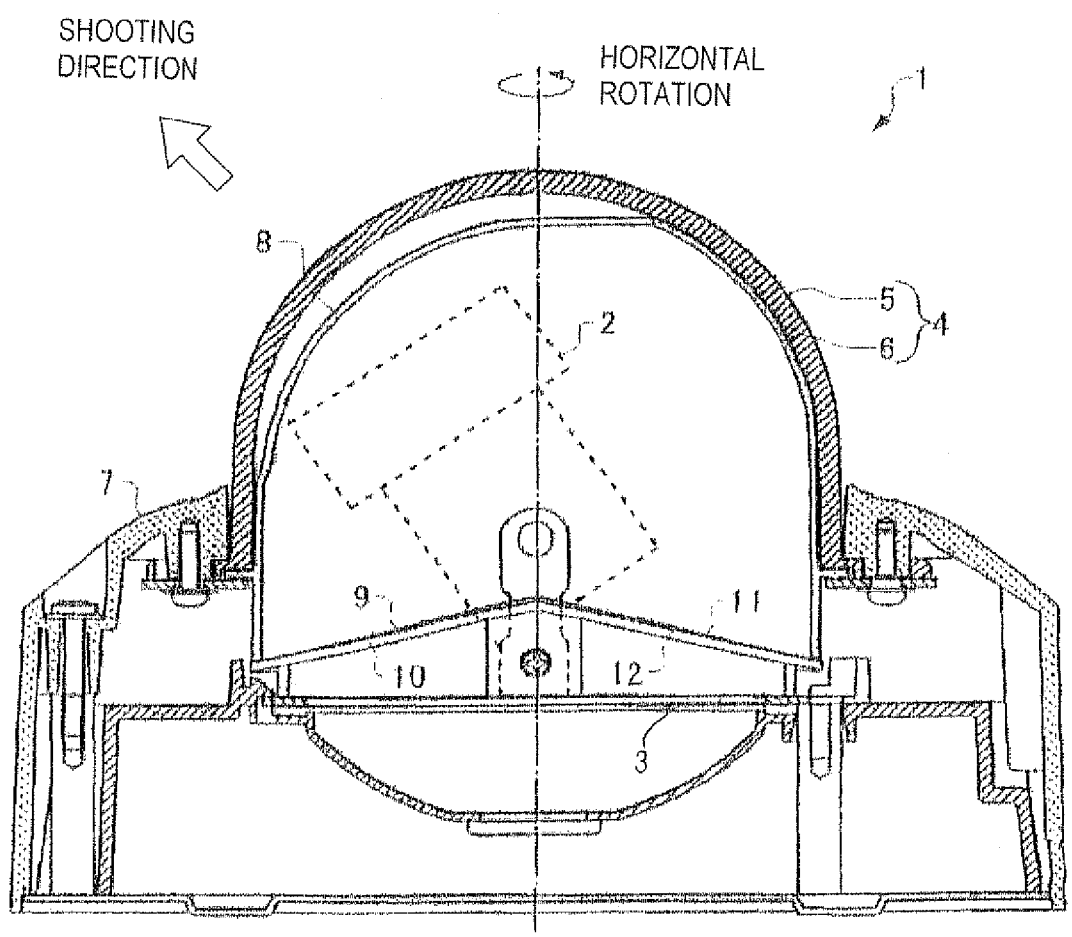
FIG. 4 is a sectional view of the camera device in the first embodiment.

As shown in FIGS. 1 and 4, a first slope portion 9 which is inclined such that a position corresponding to the direction of the camera 2 is lowered is provided on the top surface of the peripheral edge portion of the table 3, and a second slope portion 10 which is inclined such that a position corresponding to the direction of the window 8 is lowered is provided on the under surface of the inner cover 6. It is noted that in FIG. 1, for the convenience of explanation, the outer cover 5 is omitted from being shown. The first slope portion 9 is provided at a position corresponding to the direction of the camera 2, and the second slope portion 10 is provided at a position corresponding to the direction of the window 8. It is noted that the first slope portion 9 and the second slope portion 10 have shapes corresponding to each other, and in this case, shapes that closely fit to each other when the first slope portion 9 and the second slope portion 10 are brought together. Therefore, the direction of the window 8 and the direction of the camera 2 are configured to be aligned with each other in a horizontal direction when the first slope portion 9 and the second slope portion 10 are brought into contact with each other, and thus it may be said that the first slope portion 9 and the second slope portion 10 have a function of guiding the direction of the window 8 to be aligned with the direction of the camera 2.

Moreover, a first symmetric slope portion 11 having the same shape as that of the first slope portion 9 at a position corresponding to an opposite direction of the camera 2 is provided on the top surface of the peripheral edge portion of the table 3, and a second symmetric slope portion 12 having the same shape as that of the second slope portion 10 at a position corresponding to an opposite direction of the window 8 is provided on the under surface of the inner cover 6. That is, it may be said that the first symmetric slope portion 11 and the second symmetric slope portion 12 are configured such that when the cover 4 is put on the camera 2 with the direction of the camera 2 being opposite to the direction of the window 8, the first symmetric slope portion 11 comes into contact with the second slope portion 10, and the second symmetric slope portion 12 comes into contact with the first slope portion 9, allowing the cover 4 to be put on the camera 2.

Moreover, the camera device 1 includes a control unit 13 for adjusting the direction of the camera 2 from outside (see FIG. 2). The control unit 13 has a function of rotating the camera 2 in a horizontal direction or a vertical direction to adjust the direction of the camera 2.

The operation of the camera device 1 that is configured as described above will be described by using FIGS. 5 and 6. It is noted that in FIGS. 5 and 6, for the convenience of explanation, the outer cover 5 is omitted from being shown.

Figure 5:
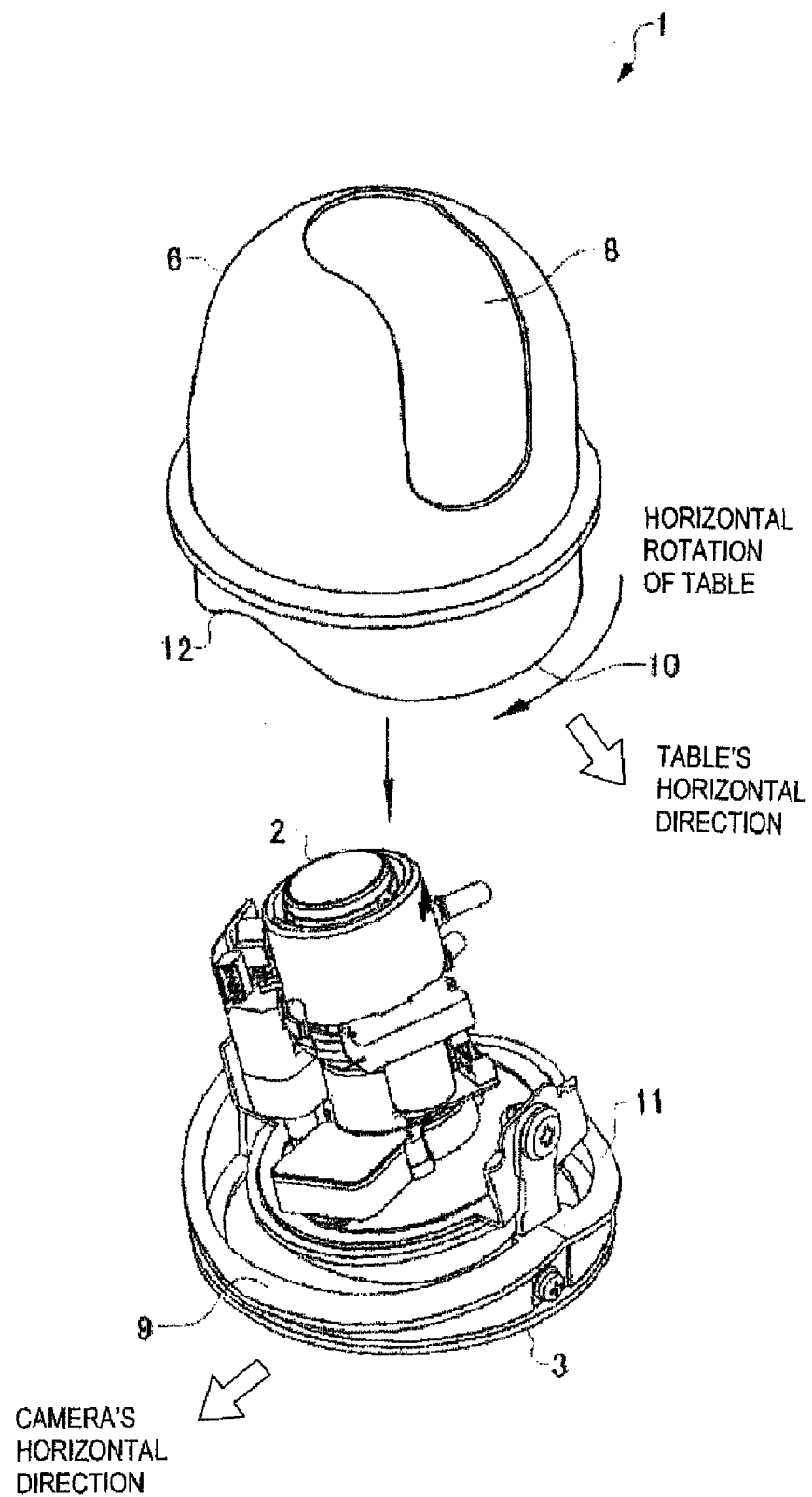
FIG. 5 is an explanatory diagram of adjustment operation of the direction of a window of a cover in the first embodiment.
Figure 6:
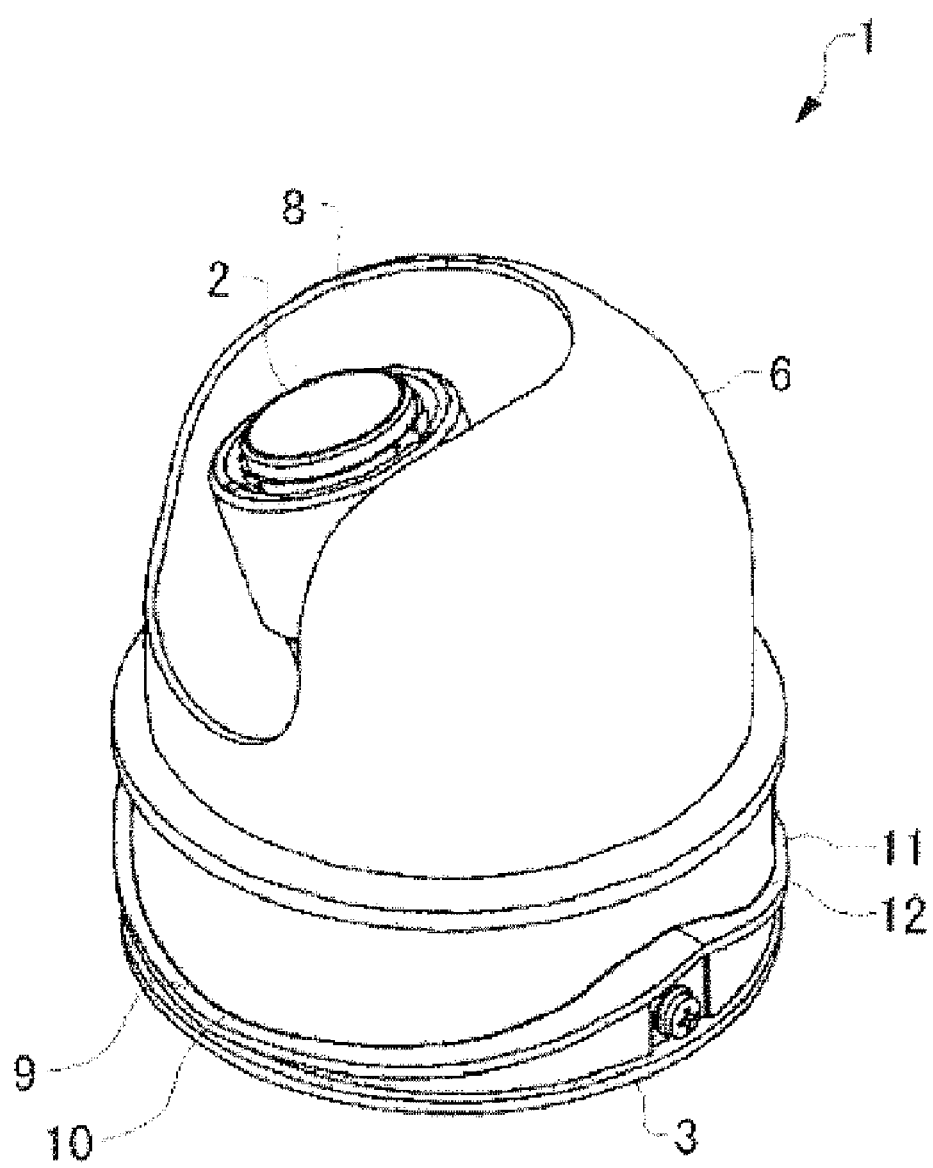
FIG. 6 is an explanatory diagram of a state in which the direction of the window of the cover in the first embodiment has been adjusted.

Upon installation of the camera device 1 according to the first embodiment of the present invention, first, the direction of the camera 2 is adjusted. As the direction of the camera 2 is rotated in a horizontal direction, the direction of the first slope portion 9 is accordingly turned to the same direction as that of the camera 2 (the direction of the first symmetric slope portion 11 is turned to the opposite direction of the camera 2). Then, as shown in FIG. 5, the cover 4 is put on the camera 2 with direction of the window 8 of the inner cover 6 being approximately aligned with the direction of the camera 2. In this case, the direction of the camera 2 (the direction of the first slope portion 9) is fixed to the adjusted direction, and the direction of the inner cover 6 (the direction of the second slope portion 10) is configured to be rotatable within the outer cover 5. Therefore, upon the cover 4 (the inner cover 6) being put on the camera 2, the inner cover 6 rotates within the outer cover 5 due to the inclinations of the first slope portion 9 and the second slope portion 10, and the first slope portion 9 and the second slope portion 10 come into close contact with each other so that the direction of the window 8 and the direction of the camera 2 are aligned in a horizontal direction as shown in FIG. 6.

When performing readjustment of the direction of the camera 2, for example, the control unit 13 is operated to change the direction of the camera 2. Then, the direction of the window 8 will change as the camera 2 rotates in a horizontal direction. In this way, upon a readjustment of the direction of the camera 2 being performed, following which, the direction of the window 8 is adjusted.

Moreover, when an operator erroneously put the cover 4 on the camera 2 with the direction of the window 8 being opposite to the direction of the camera 2, the first symmetric slope portion 11 will come into contact with the second slope portion 10, and the second symmetric slope portion 12 will come into contact with the first slope portion 9, allowing the cover 4 to be put on the camera 2.

According to such camera device 1 of the first embodiment of the present invention, it is possible to easily align the direction of the window 8 of the cover 4 with the direction of the camera 2 by providing a first slope portion 9 (the first direction guide portion) corresponding to the direction of the camera 2 on the table 3, and providing the second slope portion 10 (the second direction guide portion) corresponding to the direction of the window 8 on the cover 4.

That is, in the present embodiment, upon the first slope portion 9 (the first direction guide portion) and the second slope portion 10 (the second direction guide portion) being brought into contact with each other by putting the cover 4 on the camera 2 after the adjustment of the direction of the camera 2 in the installation work of the camera device 1, the direction of the window 8 will come to align with the direction of the camera 2 in a horizontal direction. This makes it possible to easily align the direction of the window 8 of the cover 4 with the direction of the camera 2 simply by putting the cover 4 on the camera 2.

Moreover, in the present embodiment, it is possible to prevent the camera 2 from being subjected to an external force, by the outer cover 5 that is non-rotatably fixed with respect to the case 7. Moreover, upon putting the cover 4 on the camera 2, the inner cover 6 rotates with respect to the outer cover 5 (and the case 7), thereby bringing the first slope portion 9 (the first direction guide portion) and the second slope portion 10 (the second direction guide portion) into contact with each other. This makes it possible to easily align the direction of the window 8 of the inner cover 6 with the direction of the camera 2 simply by putting the cover 4 on the camera 2.

Further, in the present embodiment, as the direction of the camera 2 is changed by operating the control unit 13, the direction of the window 8 changes accordingly. For example, upon a readjustment of the direction of the camera 2 being performed, following which, the direction of the window 8 is adjusted. This will allow the direction of the window 8 of the cover 4 to be automatically aligned with the direction of the camera 2, when the direction of the camera 2 is adjusted.

Further, in the present embodiment, the outer cover 5 that is treated with smoke processing can prevent the inside of the camera 2 from being seen from outside, thereby improving crime prevention effects. In this case, since the direction of the window 8 of the inner cover 6 can be aligned with the direction of the camera 2 simply by putting the cover 4 on the camera 2 even if the inside of the camera 2 cannot be seen from outside, a high workability in the installation work (the adjustment work of the direction of the window 8 of the cover 4) of the camera device 1 is maintained.

Further, in the present embodiment, upon bringing the first slope portion 9 and the second slope portion 10 into contact with each other by putting the cover 4 on the camera 2, the direction of the window 8 will come to align with the direction of the camera 2 in a horizontal direction. This makes it possible to easily align the direction of the window 8 of the cover 4 with the direction of the camera 2 simply by putting the cover 4 on the camera 2. In this case, since the position corresponding to the direction of the camera 2 is lowered in the first slope portion 9, and the position corresponding to the direction of the window 8 is lowered in the second slope portion 10, it is possible to ensure a large field of view of the camera 2.

Further, in the present embodiment, when the cover 4 is put on the camera 2 with the direction of the camera 2 being opposite to the direction of the window 8, the first symmetric slope portion 11 will come into contact with the second slope portion 10, and the second symmetric slope portion 12 will come into contact with the first slope portion 9, thereby allowing the cover 4 to be put on the camera 2. This makes it possible to prevent that an excess force is exerted to bring the first slope portion 9 and the second slope portion 10 into contact with each other when the cover 4 is put on the camera 2 in an opposite direction.

Second Embodiment

Next, a camera device 1 of a second embodiment of the present invention will be described with reference to FIGS. 7 and 8. Here, description will made with emphasis on the points that the camera device 1 of the present embodiment differs from that of the first embodiment. That is, unless otherwise stated herein, the configuration of the camera device 1 of the present embodiment is similar to that of the first embodiment.

Figure 7:
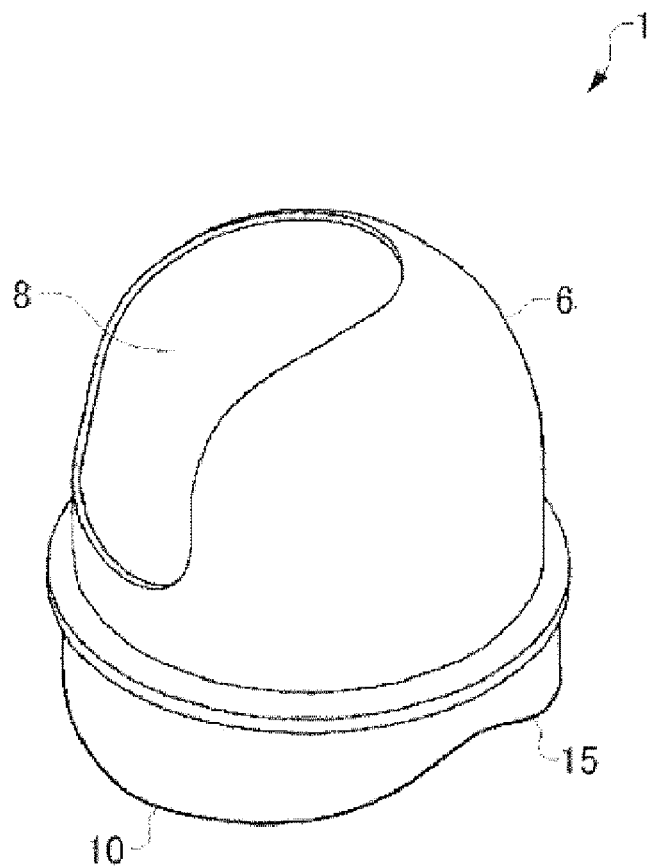
FIG. 7 is an exploded perspective view to illustrate the configuration of principal parts of a camera device in a second embodiment.
Figure 7:
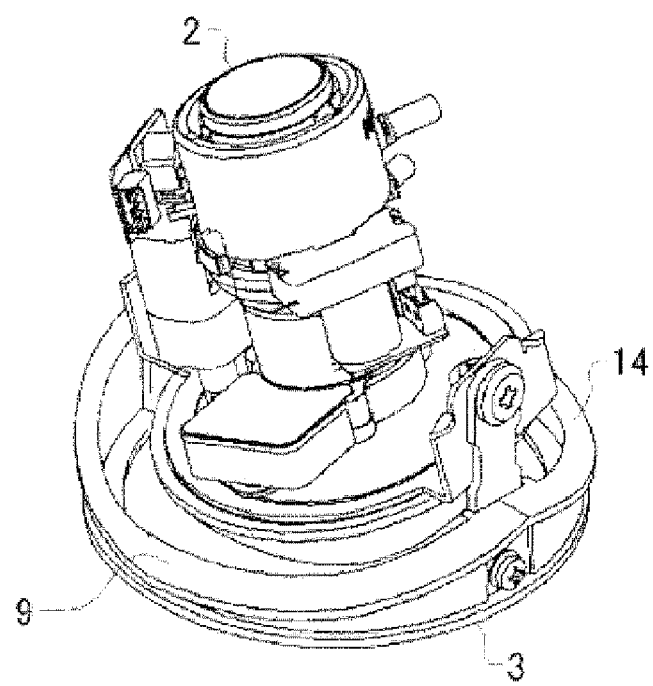
Figure 8:
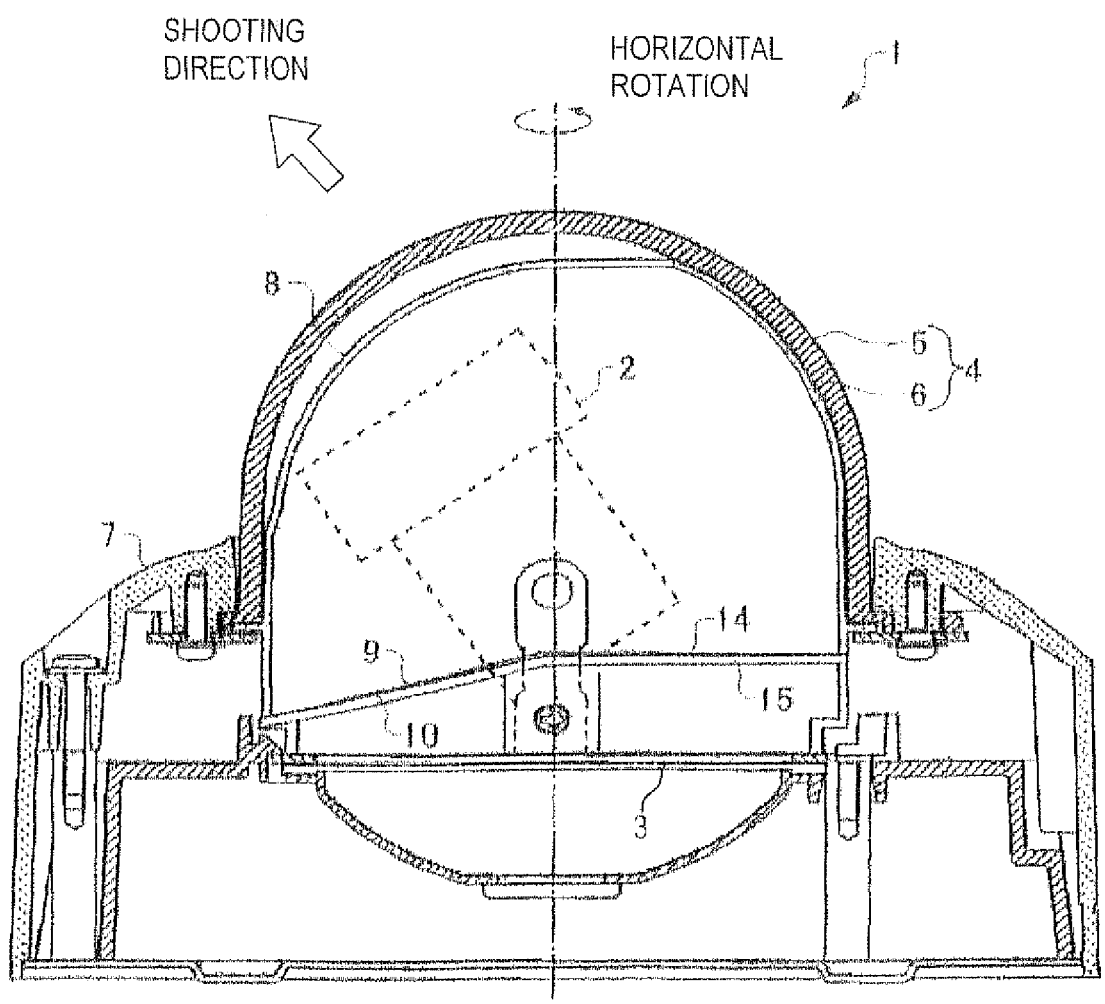
FIG. 8 is a sectional view of the camera device in the second embodiment.

FIG. 7 is an exploded perspective view to illustrate the configuration of principal parts of a camera device 1 of the present embodiment, and FIG. 8 is a sectional view of the camera device 1 of the present embodiment. As shown in FIGS. 7 and 8, a first asymmetric portion 14 having a shape different from that of the first slope portion 9 is provided at a position corresponding to an opposite direction of the camera 2 on the top surface of the peripheral edge portion of the table 3, and a second asymmetric portion 15 having a shape different from that of the second slope portion 10 is provided at a position corresponding to an opposite direction of the window 8 on the under surface of the inner cover 6. That is, it can be said that the first asymmetric portion 14 and the second asymmetric portion 15 are configured such that when the cover 4 is put on the camera 2 with the direction of the camera 2 being opposite to the direction of the window 8, the first asymmetric portion 14 will come into contact with the second slope portion 10, and the second asymmetric slope portion 15 will come into contact with the first slope portion 9, thereby not allowing the cover 4 to be put on the camera 2.

According to the camera device 1 of the second embodiment of the present invention, similar operation advantages to those of the first embodiment can be achieved.

In this case, when the cover 4 is put on the camera 2 with the direction of the camera 2 being opposite to the direction of the window 8, the first asymmetric portion 14 comes into contact with the second slope portion 10, and the second asymmetric portion 15 comes into contact with the first slope portion 9, thereby not allowing the cover 4 to be put on the camera 2. This makes it possible to sense that the cover 4 has been put on the camera 2 in an opposite direction.

Although embodiments of the present invention have been described by way of examples so far, the scope of the present invention will not be limited to those embodiments, and alterations/modifications thereto may be made as needed within the scope set forth in the claims for patent.

Thus, although currently conceivable preferred embodiments of the present invention have been described, it will be appreciated that various modifications can be made to the present embodiments, and it is intended that all the modifications within the true spirit and scope of the present invention are included in the appended claims for patent.

INDUSTRIAL APPLICABILITY

As so far described, the camera device relating to the present invention has advantages in that the direction of the window of the cover can be easily aligned with the direction of the camera, and is useful for security cameras etc. installed on walls and ceilings of facilities.

REFERENCE SIGNS LIST

1 Camera device
2 Camera
3 Table
4 Cover
5 Outer cover
6 Inner cover
7 Case
8 Window
9 First slope portion
10 Second slope portion
11 First symmetric slope portion
12 Second symmetric slope portion
13 Control unit
14 First asymmetric portion
15 Second asymmetric portion

The invention claimed is:

1. A camera device, comprising:
a camera having a shooting direction set at a predetermined direction;
a table having the camera supported thereon and having a first direction guide portion disposed at a position on the table corresponding to the shooting direction of the camera, wherein the table is rotatable in a horizontal direction; and
a cover mounted on the table to cover the camera and configured to enable relative rotation between the cover and the table and having a window for ensuring a shooting field of view of the camera, and having a second direction guide portion having a shape that corresponds with that of the first direction guide portion, with the cover and the camera being rotatable relative to each other to enable the second direction guide portion to be adjusted so as to be disposed at a position corresponding in horizontal direction with the window, the cover being mounted on the table in a configuration to enable the second direction guide portion to contact the first direction guide portion and align the window with the shooting direction of the camera, wherein
in response to relative rotation between the cover and the table, the first direction guide portion and the second direction guide portion are brought into contact with each other, such that the window and the camera become aligned with each other in the horizontal direction,
the first direction guide portion is a first slope portion which is provided on an upper surface of the table, and at a position corresponding to the direction of the camera, and
the second direction guide portion is a second slope portion which is provided on an under surface of the cover, and at a position corresponding to the direction of the window.

2. The camera device according to claim 1, wherein
the cover comprises an outer cover and an inner cover,
the outer cover is non-rotatably fixed with respect to a case,
the inner cover is rotatable with respect to the case and the outer cover, and comprises the window and the second direction guide portion, and
the inner cover is configured to rotate within the outer cover, with the first direction guide portion and the second direction guide portion being in contact with each other, and the window and the camera being aligned in the horizontal direction.

3. The camera device according to claim 2, wherein
the outer cover comprises a surface that is treated with smoke processing.

4. The camera device according to claim 1, further comprising
a control unit configured to adjust the direction of the camera by rotating the camera in a horizontal direction relative to the cover, wherein
the direction of the window is aligned with the direction of the camera in the horizontal direction when the adjustment of the direction of the camera is performed.

5. The camera device according to claim 1, wherein
a first symmetric slope portion having a shape the same as that of the first slope portion is provided at a position corresponding to an opposite direction of the camera, and
a second symmetric slope portion having a shape the same as that of the second slope portion is provided at a position corresponding to an opposite direction of the window.

6. The camera device according to claim 1, wherein
a first asymmetric portion having a different shape from that of the first slope portion is provided at a position corresponding to an opposite direction of the camera, and
a second asymmetric portion having a different shape from that of the second slope portion is provided at a position corresponding to an opposite direction of the window.

7. A camera device, comprising:
a camera;
a table supporting the camera, wherein the table is rotatable in a horizontal plane and has a first direction guide portion, with the first direction guide portion being located at a position on the table that corresponds with a shooting direction of the camera; and
a cover having a camera window and a second direction guide portion, wherein the second direction guide portion of the cover has a portion corresponding in shape with that of the first direction guide portion of the table, and the second direction guide portion is located at a position on the cover that corresponds in direction with the window, wherein
the cover is mounted on the table to cover the camera and to enable relative rotation between the cover and the table, wherein the cover and the camera are rotatable relative to each other to enable the second direction guide portion to be adjusted so as to be disposed at a position corresponding in horizontal direction with the window, and
in response to relative rotation between the cover and the table, the first direction guide portion and the second guide portion are brought into contact with each other such that the window and the shooting direction of the camera become aligned with each other in the horizontal direction, wherein:

the first direction guide portion is a first slope portion which is provided on an upper surface of the table, and at a position corresponding to the direction of the camera, and the second direction guide portion is a second slope portion which is provided on an under surface of the cover, and at a position corresponding to the direction of the window.

8. The camera device according to claim 7, wherein a first symmetric slope portion having a shape as that of the first slope portion is provided at a position corresponding to an opposite direction of the camera, and a second symmetric slope portion having a shape as that of the second slope portion is provided at a position corresponding to an opposite direction of the window.

9. The camera device according to claim 7, wherein a first asymmetric portion having a different shape from that of the first slope portion is provided at a position corresponding to an opposite direction of the camera, and a second asymmetric portion having a different shape from that of the second slope portion is provided at a position corresponding to an opposite direction of the window.

* * * * *